Ccc# United States Patent
Jin et al.

(10) Patent No.: US 10,287,874 B2
(45) Date of Patent: May 14, 2019

(54) HYDRAULIC FRACTURE MONITORING BY LOW-FREQUENCY DAS

(71) Applicant: CONOCOPHILLIPS COMPANY, Houston, TX (US)

(72) Inventors: Ge Jin, Houston, TX (US); Charles C. Mosher, Houston, TX (US); Frank P. Filice, Houston, TX (US); Kyle R. Krueger, Houston, TX (US); Ali Tura, Golden, CO (US); Baishali Roy, Houston, TX (US); Dana M. Jurick, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 163 days.

(21) Appl. No.: 15/453,650

(22) Filed: Mar. 8, 2017

(65) Prior Publication Data

US 2017/0260854 A1 Sep. 14, 2017

Related U.S. Application Data

(60) Provisional application No. 62/305,758, filed on Mar. 9, 2016, provisional application No. 62/305,777, filed on Mar. 9, 2016.

(51) Int. Cl.
*E21B 47/10* (2012.01)
*E21B 47/12* (2012.01)
(Continued)

(52) U.S. Cl.
CPC ...... *E21B 47/101* (2013.01); *E21B 47/02208* (2013.01); *E21B 47/02216* (2013.01);
(Continued)

(58) Field of Classification Search
CPC ...... E21B 47/101; E21B 43/166; E21B 44/00; E21B 49/00; E21B 41/0092;
(Continued)

(56) References Cited

U.S. PATENT DOCUMENTS

| 8,950,482 B2 * | 2/2015 | Hill | E21B 43/11857 |
| | | | 166/177.5 |
| 2009/0114386 A1 * | 5/2009 | Hartog | E21B 43/26 |
| | | | 166/250.08 |

(Continued)

OTHER PUBLICATIONS

Molenaar, Mathieu M., et al—"Real-Time Downhole Monitoring of Hydraulic Fracturing Treatments Using Fibre Optic Distributed Temperature and Acoustic Sensing", 2012, SPE International, SPE 152981, Society of Petroleum Engineers, European Unconventional Resources Conference and Exhibition held in Vienna, Austria Mar. 20-22, 2012; pp. 1-13; 13 pgs.

(Continued)

Primary Examiner — Michael R Wills, III
(74) Attorney, Agent, or Firm — Boulware & Valoir (57) ABSTRACT

A method of monitoring hydraulic fracturing using DAS sensors in a treatment well and/or observation well is described. The raw data is transformed using a low pass filter (≤0.05 Hz) and down-sampled to show the signal as the stimulation progresses. The resulting data can be used to optimize the hydraulic fracturing or improve reservoir models for other reservoirs.

16 Claims, 3 Drawing Sheets

(51) Int. Cl.
  *E21B 47/022* (2012.01)
  *G01K 11/32* (2006.01)
  *G01H 9/00* (2006.01)
  *G01V 1/22* (2006.01)
  *G01V 1/40* (2006.01)

(52) U.S. Cl.
  CPC ............ *E21B 47/123* (2013.01); *G01H 9/004* (2013.01); *G01K 11/32* (2013.01); *G01V 1/226* (2013.01); *G01V 1/40* (2013.01)

(58) Field of Classification Search
  CPC ...... E21B 43/2406; E21B 47/00; E21B 43/20; E21B 47/02216; E21B 43/16; E21B 43/26; E21B 47/02208; E21B 47/123; E21B 33/12; E21B 47/065; E21B 47/1015; G01V 1/226; G01V 1/40; G01F 1/666; G01H 9/004; G01K 11/32; G01B 11/161
  See application file for complete search history.

(56) References Cited

U.S. PATENT DOCUMENTS

| | | | |
|---|---|---|---|
| 2009/0194333 A1 | 8/2009 | MacDonald | |
| 2009/0326826 A1* | 12/2009 | Hull | E21B 47/1005 702/8 |
| 2011/0019178 A1* | 1/2011 | Vlatas | G01B 11/18 356/32 |
| 2012/0067118 A1 | 3/2012 | Hartog et al. | |
| 2013/0233537 A1* | 9/2013 | McEwen-King | E21B 43/26 166/250.1 |
| 2013/0298665 A1 | 11/2013 | Minchau | |
| 2014/0036628 A1* | 2/2014 | Hill | G01V 1/42 367/35 |
| 2014/0110124 A1* | 4/2014 | Goldner | E21B 47/1025 166/337 |
| 2014/0202240 A1* | 7/2014 | Skinner | E21B 47/101 73/152.32 |
| 2014/0246191 A1 | 9/2014 | Zolezzi-Garreton | |
| 2015/0014521 A1* | 1/2015 | Barfoot | E21B 47/123 250/261 |
| 2016/0138389 A1* | 5/2016 | Stokely | E21B 47/123 340/854.7 |
| 2018/0217285 A1* | 8/2018 | Walters | G01V 1/303 |

OTHER PUBLICATIONS

Webster, P., et al—"Developments in Diagnostic Tools for Hydraulic Fracture Geometry Analysis", 2013, Unconventional Resources Technology Conferene (URTeC), Denver, Colorado, Aug. 12-14, 2013, SPE 168933/URTec 1619968, pp. 1-7; 7 pgs.

Paleja, Rakesh, et al—"Velocity Tracking for Flow Monitoring and Production Profiling Using Distributed Acoustic Sensing", 2015, Society of Petroleum Engineers, SPE-174823-MS, Presented at the SPE Annual Technical Conference and Exhibition held in Houston, TX USA Sep. 28-30, 2015, pp. 1-16; 16 pgs.

Boone, K., et al—"Monitoring Hydraulic Fracturing Operations Using Fiber-Optic Distributed Acoustic Sensing", 2015, Unconventional Resources Technology Conference, SPE-178648-MS/URTeC:2158449, Presented at the Unconventional Resources Technology Conference held in San Antonio, TX, USA Jul. 20-22, 2015, pp. 1-8; 8 pgs.

International Search Report—PCT/US2017/021678 dated Jun. 1, 2017; 2 pgs.

* cited by examiner

HYDRAULIC FRACTURE MONITORING BY LOW-FREQUENCY DAS

PRIOR RELATED APPLICATIONS

This application is a non-provisional application which claims benefit under 35 USC § 119(e) to U.S. Provisional Applications Ser. No. 62/305,758 filed Mar. 9, 2016, entitled "LOW FREQUENCY DISTRIBUTED ACOUSTIC SENSING," and Ser. No. 62/305,777 filed Mar. 9, 2016, entitled "PRODUCTION LOGS FROM DISTRIBUTED ACOUSTIC SENSORS," which are incorporated herein in their entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates generally to hydraulic fracturing. In particular, fiber optic cables sensing Distributed Acoustic Sensing (DAS) signals are used to monitor stimulation operations.

BACKGROUND OF THE DISCLOSURE

Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material of a e.g. shale formation. Therefore, such reservoirs require special recovery operations outside the conventional operating practices in order to mobilize and produce the oil.

The rapid development of extracting hydrocarbons from these unconventional reservoirs can be tied to the combination of horizontal drilling and induced fracturing (call "hydraulic fracturing" or simply "fracking") of the formations. Horizontal drilling has allowed for drilling along and within hydrocarbon reservoirs of a formation to better capture the hydrocarbons trapped within the reservoirs. Additionally, increasing the number of fractures in the formation and/or increasing the size of existing fractures through fracking increases hydrocarbon recovery.

In a typical hydraulic fracturing treatment, fracturing treatment fluid is pumped downhole into the formation at a pressure sufficiently high enough to cause new fractures or to enlarge existing fractures in the reservoir. Next, frack fluid plus a proppant, such as sand, is pumped downhole. The proppant material remains in the fracture after the treatment is completed, where it serves to hold the fracture open, thereby enhancing the ability of fluids to migrate from the formation to the well bore through the fracture. The spacing between fractures as well as the ability to stimulate fractures naturally present in the rock may be major factors in the success of horizontal completions in unconventional hydrocarbon reservoirs.

While there are a great many fracking techniques, one useful technique is "plug-and-perf" fracking. Plug-and-perf completions are extremely flexible multistage well completion techniques for cased hole wells. Each stage can be perforated and treated optimally because the fracture plan options can be modified in each stage. The engineer can apply knowledge from each previous stage to optimize treatment of the current fracture stage.

The process consists of pumping a plug-and-perforating gun to a given depth. The plug is set, the zone perforated, and the tools removed from the well. A ball is pumped downhole to isolate the zones below the plug and the fracture stimulation treatment is then pumped in, although washing, etching, and other treatments may occur first depending on downhole conditions. The ball-activated plug diverts fracture fluids through the perforations into the formation. After the fracture stage is completed, the next plug and set of perforations are initiated, and the process is repeated moving further up the well.

The key to reducing the cost of unconventional production using fracking is to optimize the fracturing parameters, namely well spacing, cluster spacing, job size, hydraulic fracture growth and geometry, and the like. Thus, the ability to monitor the geometry, spacing, orientation and length of the induced fractures is important to obtain optimal fracking. However, conventional monitoring methods, such as microseismic imaging, borehole gauges, or tracers provide very limited information about the fracture geometry and, hence, the effectiveness of the fracturing process and/or results.

Although hydraulic fracturing is quite successful, even incremental improvements in technology can mean the difference between cost effective production and reserves that are uneconomical to produce. Thus, what is needed in the art are improved methods of evaluating the hydraulic fracturing for every well being hydraulically simulated. Ideally, the improved methods would allow for monitoring the stimulation, as well as the ability to diagnose completion issues during the operation and monitor the production performance along complete well bore length

SUMMARY OF THE DISCLOSURE

Described herein are methods for monitoring hydraulic fracturing stimulations using Distributed Acoustic Sensing (DAS). DAS data differs from seismic data collected by geophone in a few ways. First, fibers can be deployed down treatment wells, allowing the recording of acoustic signal in environments that would be prohibitive for geophones. Second, DAS is primarily sensitive along its axis, making it analogous to a single component geophone oriented along the wellbore (which itself could be deviated and changing orientation). Lastly, at low frequencies DAS can be sensitive to temperature variations, mechanical strain as well as acoustic sources. Thus, more information is potentially available with DAS than with seismic methods.

Specifically, fiber optic cables deployed in the stimulation well and/or at one or more observation wells act as the sensing element for DAS signals in the low frequency band of greater than 0 to 0.05 Hz (50 millihertz or mHz). The low frequency band is used because the resulting data contains polarity information. The low frequency band DAS signals are recorded and used to estimate stimulation parameters, including hydraulic fracture growth and geometry, isolation conditions between stages, and other key factors that determine fracture efficiency. The signals can also be used to diagnose potential completion or fracturing issues that may affect the production phase.

DAS is the measure of Rayleigh scatter distributed along the fiber optic cable. In use, a coherent laser pulse from an interrogator is sent along the optic fiber and scattering sites within the fiber itself causes the fiber to act as a distributed interferometer with a pre-set gauge length. Thus, interactions between the light and material of the fiber can cause a small amount of light to backscatter and return to the input end, where it is detected and analyzed. Acoustic waves, when interacting with the materials that comprise the optical fiber, create small changes in the refractive index of the fiber optic cable. These changes affect the backscatter characteristics, thus becoming detectable events. Using time-domain techniques, event location is precisely determined, providing fully distributed sensing with resolution of 1 meter or less.

The intensity and phase of the reflected light is measured as a function of time after transmission of the laser pulse. When the pulse has had time to travel the full length of the fiber and back, the next laser pulse can be sent along the fiber. Changes in the reflected intensity and phase of successive pulses from the same region of fiber are caused by changes in the optical path length of that section of fiber. This type of system is very sensitive to both strain and temperature variations of the fiber and measurements can be made almost simultaneously at all sections of the fiber.

DAS has been used to monitor various facets of the hydraulic fracturing operation, including injection fluid allocation (e.g. Broone et al. 2015), hydraulic fracture detection (e.g. Webster et al. 2013), and production allocation (e.g. Paleja et al. 2015). However, these applications focus on the DAS signals that are in high frequency bands (>1 Hz), and some applications only use the "intensity" of the signal (waterfall plot), which is obtained through a RMS averaging operation. Further, the RMS intensity plot does not contain polarity information that is critical for the signal interpretation. High-frequency signal also lacks the polarity information, hence the use of low-pass filtering.

In the present methods, by contrast, only low-frequency bands of ≤0.05 Hz are utilized. The DAS signal in this frequency range is very sensitive to strain variations caused by borehole temperature changes and hydraulic fracture growth during completion and production. The DAS signal in an offset or observational well responds to strain variations induced by fracture growth, which provides critical information to contain fracture geometry. In a stimulation or treatment well, the DAS signal is mainly controlled by the borehole temperature variations and can be used to determine isolation conditions between stages and warm-back signatures of each cluster in a short period after the job.

The DAS signal in the low-frequency bands also provides measurements with a much higher spatial and temporal resolution compared with other conventional methods such as tracers, microseismic imaging and the like.

The preferred optical fibers are those capable of working in harsh environments. In harsh environments, like those found in oil and gas applications, molecular hydrogen will diffuse from the environment, through virtually all materials, and nest in the core of the optical fiber. This build-up of hydrogen causes attenuation to increase, is highly variable, and affected by temperature, pressure, and hydrogen concentration. Thus, fibers suitable for oil and gas applications are required. Exemplary fibers include the Ge-doped single mode and Pure-core single mode from OFS Optics; Downhole Fibers from FIBERCORE; FiberPoint Sensors from Halliburton, and OmniWell from Weatherford. Schlumberger also offers a heterodyne distributed vibration sensing system for DAS and Ziebel offers Z-ROD, an optical fiber inside a carbon rod.

The well signal may be recorded from a fiber installed in a treatment wellbore consisting of a production well or an injection well. Alternatively, the well signal may be obtained in a cross-well signal from a wellbore that is adjacent to the well of interest consisting of a production well, and injection well, an observation well, a vertical well, or other well within the formation. The signal can be obtained in either vertical or horizontal wells, but the main application is expected to be for use in horizontal wells in unconventional reservoirs.

Figure 5:
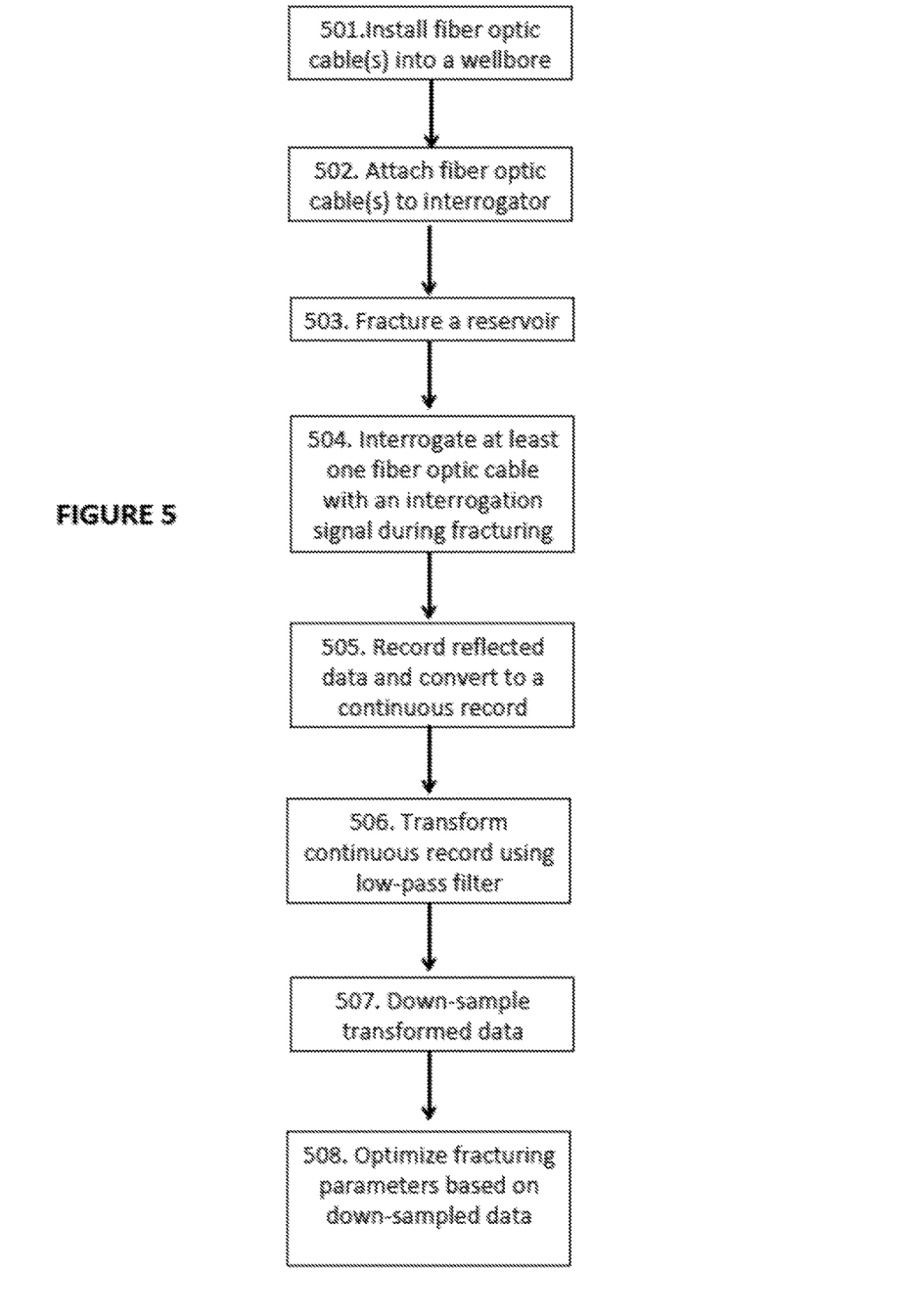
FIG. 5 depicts one embodiment of the methods disclosed herein.

In most embodiments, the fiber optic cables are installed (501) in the treatment well per FIG. 5. This would allow for DAS data that is sensitive to borehole temperature variations in a short time period during and after e.g., a fracture stage (503), a well opening/closing event, choke size change during production and the like. Borehole temperatures can be useful in determining isolation efficiency between stages and warm-back signatures of individual clusters.

However, addition fibers can alternatively or in addition be installed in offset observational wells because the DAS signal from these wells would respond to strain variations induced by the fracture growth. This information is important in containing fracture growth. Discrete fiber locations that is extended during pumping and contracted afterwards are interpreted as fractures intersecting the observation well. The fracture number and spacing for each completion stage can be measured to evaluate stimulation efficiency. Formation stress response, like stress shadows and relaxation, surrounding the fractures can also be observed and quantitatively measured at the monitor well.

The Rayleigh scattering that travels through the fibers is collected by an interrogator connected to each fiber (502/504). It is also possible to use the same interrogator to monitor multiple fibers. Numerous interrogators are available to record optical signals including single laser, dual laser, multiple laser, PINNACLE™ Gen-1 and Phase-1 or Phase-2, HALLIBURTON FIBERWATCH™, PROXIMION™ FBG-Interrogator, NATIONAL INSTRUMENTS™ PXI, LUNA™, Silixa iDAS™, Optasense OPTASENSE®, Fotech Helios® or other interrogator.

In one embodiment, Pinnacle Gen-1 and Phase-2 interrogators are used for the recording the detected acoustic signals. In other embodiments, Silixa iDAS™ is used.

The interrogator collects the data in at least one data set. The raw data may be at more than 6000 locations (frequently referred to as "channels") with a variety of spatial separations from centimeters to meters along the fiber dependent upon length and required sensitivity. The gauge length may also be varied dependent upon fiber length and the interrogator used, from 1-100 meters, including 1, 5, 10, 25, 50, 75 and 100 meters. When recording, the measured optical phase is differentiated in time, so the raw DAS data is linearly associated with strain rate along the fiber. The low-pass filter does not affect these parameters. The gauge length and spatial spacing of the channels are determined by the signal-to-noise level and manufacturer of the interrogator.

The DAS data is also sampled at very high frequency (1-20 kHz), and segmented into small time intervals. The high temporal sample rate is necessary for low frequency signal due to the signal aliasing. The collected data volume ranges from 100 TB to 1000 TB for a single project.

To decrease the size of the dataset for quicker and more efficient processing, we have developed a simple process to convert the DAS data into a signal that is useable for the disclosed method.

The DAS segmented data is first merged to a continuous record. (505) Then, the continuous record is passed through a low-pass frequency filter transform (506) to obtain the desired ≤0.05 Hz range and is downsampled to 1 second intervals thereafter (507). This process significantly increases the signal-to-noise ratio of the desired signal, while decreasing the data size by 10,000 fold, allowing for more efficient analysis. The low frequency filtered data also maintains the polarity of the DAS strain-rate measurements (compression or extension), which will have a significant impact for later interpretation.

The methods describe above utilize non-transitory machine-readable storage medium, which when executed by at least one processor of a computer, performs the steps of the method(s) described herein.

Due to the nature of the data pre- and post-transform, parallel computing and data storage infrastructure created for data intensive projects, like seismic data processing, are used because they can easily handle the complete dataset. Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Alternatively, many-cores can be used in the computing. A Linux based multi-core cluster has been used to process the data in the examples described herein.

Once converted, the transformed dataset can be displayed in any data analysis software capable of displaying DAS data. Examples in the oil and gas industry include Fiber-View, SeisSpace® or STIMWATCH® from Halliburton, WellWatcher from Schlumberger. Other useful software that is not specific to the oil and gas industry include Matlab, Spotfire, Python, and Excel. Most software can be used to convert the data into a continuous record, transform the data, and down sample the data using pre-programmed operations. However, operations to perform these steps can be programmed if needed.

The displayed DAS signal or dataset can then be used as an interpretive tool to monitor the hydraulic fracturing stimulation. In some scenarios, the data will inform the project manager that a current fracturing stage does not have good isolation, thus, allowing the manager to modify the stimulation plan to improve the isolation. In other scenarios, the project manager will be able to monitor the growth of new fractures and/or the forcible closing of old fractures. This method can also be used as a real time estimation of the effects of perforation locations, slurry injection rate, proppant concentration, and the like, on a given stimulation plan.

In some embodiments, the observed changes in the reservoir can be inputted into a reservoir modeling program to optimize (508) the proposed hydraulic fracturing methods for a given reservoir or reservoirs similar in character to the reservoir being monitored. The optimized fracture program can then be implemented downhole in the subsequent fracture stages. The final fractured well can then be used to produce oil or other hydrocarbon.

The disclosed methods include any of the below embodiments:

A method of improving the hydraulic fracturing of a reservoir comprising installing one or more fiber optic cables in one or more wells in the reservoir, wherein each fiber optic cable is attached to an interrogator; interrogating a pulsing light through the fiber optic cables; recording at least one data set of the Rayleigh backscatter in real time using the interrogator; converting the dataset from the interrogator into a continuous record; transforming the continuous record with a low-pass filter of 0 to 0.05 Hz (0-50 mHz) while down sampling the data into a transformed well signal; interpreting the transformed well signal; and modifying and implementing a fracturing plan based on the transformed well signal and thereby improving hydrocarbon production from the hydrocarbon formation.

The method can be applied to treatment wells or to observational wells or both. In some embodiments, at least 3 wells are monitored according to the method, and the date displayed in 3D or the data used in triangulation based methods.

Further, the methods herein described can be combined with other fracture monitoring methods, such as microseismic monitoring, DTS cross-well temperature monitoring, proppant tracer analysis, and geochemistry analysis.

Any method described herein, including the further step of printing, displaying or saving the initial, intermediate or final (or both) datasets of the method to a non-transitory computer readable memory.

Any method described herein, further including the step of using the final datasets in a reservoir modeling program to predict reservoir performance characteristics, such as fracturing, production rates, total production levels, rock failures, faults, wellbore failure, and the like.

Any method described herein, further including the step of using said final datasets to design and implement a hydraulic fracturing program in a similar reservoir or in subsequent fracturing stages of said reservoir.

Any method described herein, further including the step of producing hydrocarbon by said reservoir.

This summary is provided to introduce a selection of concepts that are further described below in the detailed description. This summary is not intended to identify key or essential features of the claimed subject matter, nor is it intended to be used as an aid in limiting the scope of the claimed subject matter.

"Fracking", as used herein, may refer to any human process used to initiate and propagate a fracture in a rock formation, but excludes natural processes that fracture formation, such as natural seismic events. The fracture may be an existing fracture in the formation, or may be initiated using a variety of techniques known in the art. "Hydraulic Fracking" means that pressure was applied via a fluid.

As used herein, "fracture parameters" refers to characteristics of fractures made using hydraulic fracking and includes fracture growth, fracture height, fracture geometry, isolation conditions between stages, stress shadows and relaxation, fracture spacing, perforation cluster spacing, number of perforation clusters/stage, well spacing, job size, pumping pressure, heel pressure, proppant concentration, fluid and proppant distribution between perforation clusters, pumping volume and pumping rate and the like.

As used herein, the term "interrogator" refers to an electronic device that transmits a signal, in this case a laser pulse through a fiber optic cable, to obtain a response (i.e. Rayleigh Scattering) that is typically recorded. Measurements of background noise are usually taken to determine baseline for the signal and can be subtracted out for improved signal intensity.

As used herein, an "observation well" is the well equipped with a DAS cable that is operatively coupled to a C-OTDR or equivalent equipment and is typically near or adjacent to one or more treatment wells. In some embodiments more than one Reference Well may be used, e.g., in triangulation applications. Each monitoring well is thus 10-5000 m from an active well being monitored, or between 10 m and 4000 m or 10-500 m from the active well. The limitation on how close you can get does not depend on the DAS but rather on the challenge of drilling a well that is close to another well. Thus, distances of less than 10 m are possible if the wells can be drilled that close.

As used herein, the "treatment" or "active" is the well providing the acoustic signals for sensing by the Reference Well, e.g., by implementing a fracture plan in that well.

Typically, the various wells are injection and/or production wells.

"Acoustic energy source" is used herein to denote origination of an acoustic signal. Exemplary sources include variations in borehole temperature or strain, and opening and closing of fractures either naturally or forcefully.

As used herein, "warm-back signatures" refers to after the injection of cold fluid, the borehole (and fluid inside) of the operation well is warmed-up by the formation.

As used herein, "clusters" refers to group of perforations that are shot together, usually within a foot of each.

As used herein, a "continuous record" is a dataset that has been converted from small sections, usually measured in seconds, of data pieces to a long non-breaking record, usually measured in hours or days.

As used herein, a "low-pass filter transform" is a low-pass filter applied to the continuous record, thereby creating a "transformed record."

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The term "near", as used herein, means a distance of 1 to 5000 m.

The following abbreviations are used herein:

| ABBREVIATION | TERM |
| --- | --- |
| DAS | Distributed Acoustic Sensing |
| MD | Measured Depth |
| OTDR | optical time-domain reflectometry |
| DTR | Distributed Temperature Sensing |
| PPL | Parts per liter |
| RMS | Root-Mean-Square |

DESCRIPTION OF EMBODIMENTS OF THE DISCLOSURE

The disclosure provides a novel method of improving hydraulic fracturing by monitoring the fracturing process using Distributed Acoustic Sensing (DAS) and optimizing the fracturing parameters. The fracturing plan parameters can be varied and their effects on the stimulations efficiency can be monitored and optimized using the DAS technology.

The present methods includes any of the following embodiments in any combination(s) of one or more thereof:

A method of optimizing a hydraulic fracturing stimulation of a reservoir by installing one or more fiber optic cables in at least one wellbore; attaching the fiber optic cables to an interrogator having interrogation and reflection recording functions; fracturing a stage of a multistage hydraulic fracturing stimulation in a reservoir using pre-determined parameters; interrogating at least one fiber optic cable with an interrogation signal during the fracturing, and recording one or more reflected datasets. The, the reflected datasets are converted into a continuous record, which is then transformed with a low-pass filter transform of greater than 0 to 50 millihertz (mHz) to provide a transformed record. The transformed record is down sampled and interpreting, such that the results of the interpretation are used to optimize the pre-determined parameters. The newly optimized parameters are then used to fracture a subsequent stage.

A method of optimizing a hydraulic fracturing stimulation of a reservoir by installing one or more fiber optic cables in at least one treatment wellbore and at least one observational wellbore near the treatment wellbore; attaching each fiber optic cables to an interrogator having interrogation and reflection recording functions; fracturing a stage of a multistage hydraulic fracturing stimulation in a reservoir using pre-determined parameters; interrogating at least one fiber optic cable with an interrogation signal during the fracturing, and recording two or more reflected datasets. The, the reflected datasets are converted into a continuous record, which is then transformed with a low-pass filter transform of greater than 0 to 50 millihertz (mHz) to provide a transformed record. The transformed record is down sampled and interpreting, such that the results of the interpretation are used to optimize the pre-determined parameters. The newly optimized parameters are then used to fracture a subsequent stage. The results of this method can also be displayed on a computer screen.

In any of the above methods, the data collection and transformation can be repeated a plurality of times to further optimize the fracturing parameters.

In any of the above methods, a final step of producing hydrocarbons from the reservoir is performed.

In any of the above methods, the continuous record can be downsampled to 1, 3, 5, 10, 15, 20, 25, 50, 75, or 100 second intervals.

In any of the above methods, the interrogating step comprises pulsing a laser light at a high frequency.

In any of the above methods, the reflected datasets records temperature change using fibers installed in any of the wellbores.

In any of the above methods, the reflected datasets records formation stress change using fibers installed in any of the wellbores.

A method as herein described, wherein said method is performed by a program stored in a computer, preferably one of the advanced computer systems herein described.

Any method described herein, including the further step of printing, displaying or saving to a non-transitory machine-readable storage medium the data, processed data, interpreted data or map produced via the methods herein described.

Any method as herein described, wherein said display is a 3D display and said map is a 3D map.

In its most basic format, the DAS system consists of at least one deployed fiber optic cable, and an interrogator comprising an optical source, an optical receiver and a data recorder. This device is used to monitor and record signals from acoustic energy sources in a hydraulic fracturing treatment. It can be used for each stage of the fracturing treatment and serves as an almost real-time monitor of the reservoir and its response to the fracturing treatment. Based on the observed signals, changes can be made in subsequent fracturing stages, to stimulation plans in adjacent wells, or to model similar reservoirs to improve hydrocarbon recovery and/or overcome inefficiencies in the completion process.

To obtain the DAS signal, at least one fiber optic cable is installed into the treatment well or an adjacent observation well or both. DAS data can be recorded for a variety of purposes:

1. Recording DAS data in a HFS treatment well. This enables determination of which stages and perforations preferentially take frack fluid in a quantitative manner.
2. Recording DAS data in an offset observational well. In a multi-well completion schedule, this can simply be any nearby well that is not currently being treated.

In this case we can detect when the frack fluid intersects the fibered offset observational well. We can determine the intensity of the intersection along with the time taken for the intersection to occur.

The fiber optic cables are typically installed outside of the wellbore casing and cemented in place along the length of the well before the first stage of hydraulic fracturing. It is understood, however, that the optic fiber can also be clamped or bonded to a downhole tubular, or acoustically coupled by any other means, or temporally installed through wireline or coil tubing.

At the surface, the fiber optic cable(s) are attached to an interrogator having an optical source for sending pulses through the fiber optic cable, an optical receiver for receiving reflections, and a recorder for recording the reflected optical signals. Typically, the optical source, receiver and the recorder is a single device, but this is not essential. Typically, the laser light sources and signal-receiving means are optically coupled to the fiber optic cable at the surface.

The fiber optic cable may be double-ended—folded back in the middle so that both ends of the cable are at the source, or it may be single-ended—one end at the source and the other end at a remote point. Multiple fibers within one cable can offer redundancy and the ability to interrogate with different instrumentation simultaneously.

The length of the fiber optic cable can range from a few meters to several kilometers, or even hundreds of kilometers. In either case, measurements can be based solely on backscattered light, if there is a light-receiving means only at the source end of the cable, or a light receiving means can be provided at the second end of the cable, so that the intensity of light at the second end of the fiber optic cable can also be measured. Current DAS interrogator design has the source and receiver at the same end of the fiber.

The fiber optic cables are interrogated with multiple high-speed laser pulses while monitoring the reflected light signal (Rayleigh scatter) along the fiber. This is repeated in a variety of patterns dependent upon the data being collected. The raw data are sampled at 10 kHz continuously at more than 6000 locations with 1 m spatial separation along the fiber. The gauge length is set to 5 m. When recording, the measured optical phase is differentiated in time. For observation wells, the raw DAS data is linearly associated with strain rate along the fiber. For treatment wells, the raw DAS data is linearly associated with the temperature temporal variations along the wellbore, which will vary based on backflow of reservoir fluids, and the like.

The pulsed light in the fiber optic cables experiences some distortion because of the material of the cable. However, disturbances in the scattered light may also be due to transmitted, reflected, and/or refracted acoustic energy signals in the reservoir during all stages of the hydraulic fracture process, wherein these acoustic signals may change the index of refraction of the pulse waveguide or mechanically deform the waveguide such that the optical propagation time or distance, respectively, changes.

The light source may be a long coherence length phase-stable laser, used to transmit direct sequence spread spectrum encoded light down the fiber. Localized disruptions, such as fractures or temperature change, cause small changes to the fiber, which in turn produces changes in the backscattered light signal. The returning light signal thus contains both information about disruptions, as well as location information indicating where along the fiber they occurred.

The interrogators collect and record the backscatter data, including any changes due to acoustic energy in the reservoir, and either the interrogator or an independent computer attached thereto transforms the signals into an interpretable image. The transformed data can also be displayed on screen for review or printed. Ideally, a project manager is able to view the propagation of the fracturing stimulation plan in almost real time and make adjustments to various fracturing parameters (stage distances, fracturing fluid injection speed or composition, etc.) to optimize the completion.

Proposed adjustments can be fed into a modeling program and results predicted therefrom, thereby optimizing a proposed fracturing plan. The optimized fracking parameters can then be implemented in the next stage of the fracturing plan. The process can then be repeated for each fracture stage.

In monitoring the fracturing of the well, not every negative observation in the DAS signals will need to be addressed. It is expected that one skilled in the art would understand that some features are best left alone due to economical or environmental considerations. Or, action may not need to be taken until later fracturing stages.

The present methods are exemplified with respect to the following examples and FIGS. 1-4. However, this is exemplary only, and the methods can be broadly applied to monitor or diagnose many completion issues arising during fracking. The following examples are intended to be illustrative only, and not unduly limit the scope of the appended claims.

In all of the following examples, fiber optic cables were installed in either the treatment well or an observation well, each operably connected to an interrogator operably connected with a processor. A plug-and-perf completion was performed in the treatment well for a multi-stage fracking stimulation.

In more detail, a plug was set at the bottom of the treatment well, the zone perforated, and the tools removed from the well. A ball was pumped downhole to isolate the zones below the plug and the fracture stimulation treatment fluid was pumped in. The ball-activated plug diverts fracture fluids through the perforations into the formation. After the stage was completed, the next plug and set of perforations are initiated, and the process was repeated moving further up the well.

After the fracking completion ended, the well was shut-in for a predetermined time. During the shut-in period, small differences in formation temperature permeate into the treatment well bore through thermal conduction. When production resumed, the fluid flow within the treatment well caused a measurable wave of temperature fluctuations to move in the direction of the flow. Flow rates along the well can be inferred from these temperature changes, and variations in rates provided an indication of the relative productivity of the well intervals.

DAS data was collected during the fracture stages, shut-in and production phase. This allowed for changes in the fracturing stimulation and the ability to monitor the events of those changes during the production phase.

Figure 1:
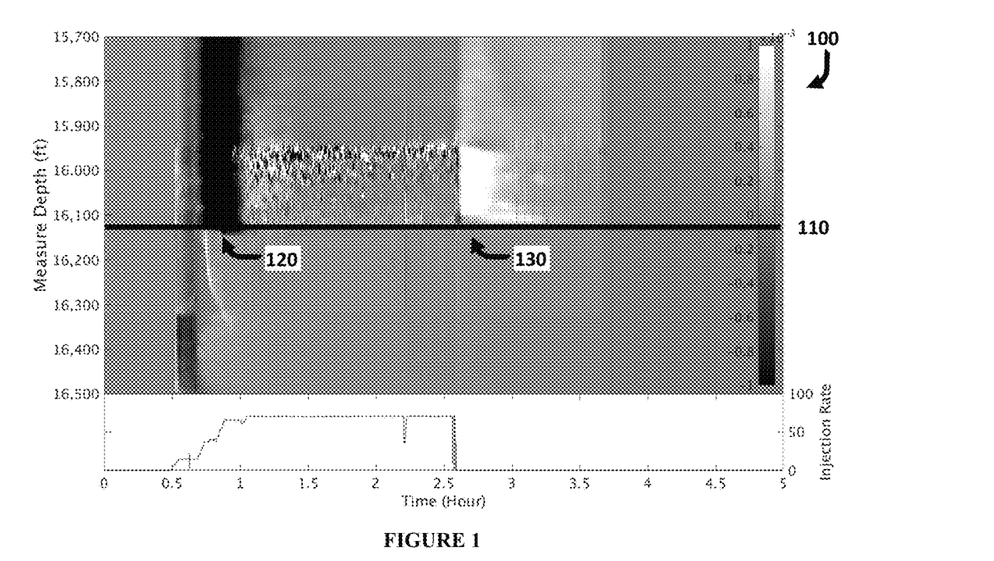
FIG. 1 Exemplary DAS dataset 100 for a fracking stage with good isolation. The y-axis is measured depth (MD) along the horizontal well and the x axis is time in hours. Warming and cooling as interpreted through compression and expansion strain represent the energy of the DAS data, white representing more energy (expansion), dark the least (compression).

FIG. 1 is an example of low-frequency DAS signal 100 in the treatment well at Eagleford Basin during a fracking stage. In the bottom graph, injection rate is plotted over time. In the DAS image, white colors are indicative of expansion or warming of the acoustic fiber and black colors are indicative of contraction or cooling related strain changes. Plug depth 110 is depicted as a horizontal line. Plug isolation can be seen 120 where the cooling is stopped at plug depth. Warmback 130 can be seen after pumping stops at 2.5 hrs.

This stage in the fracture stimulation was interpreted to have good isolation since there are no changes below the plug depth. The noisy proppant curve around 2.5 is assumed to be due to collection error.

Figure 2:
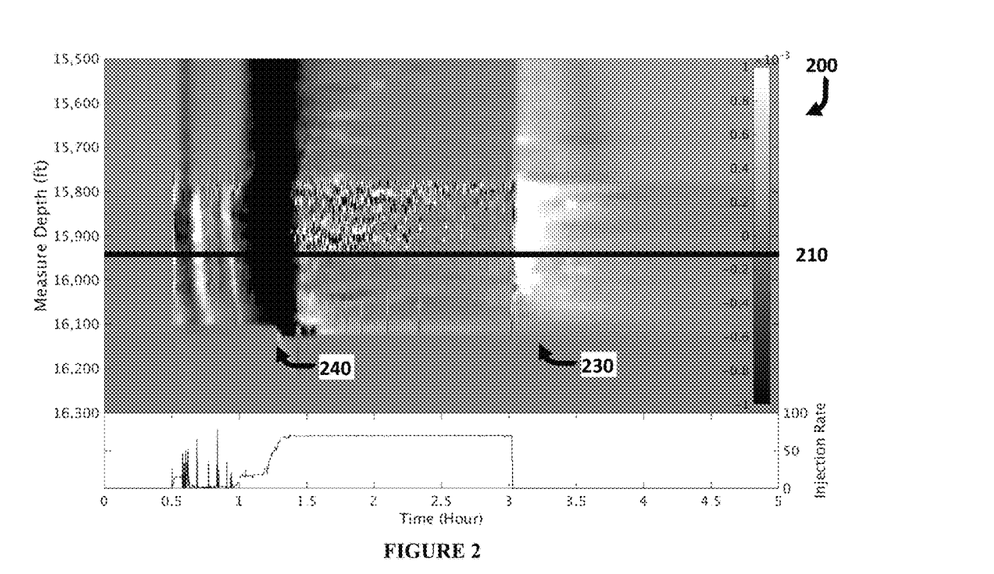
FIG. 2 Exemplary DAS dataset 200 for a fracking stage with an isolation problem.

In comparison to FIG. 1, FIG. 2 is an example of low-frequency DAS signal in the treatment well during a frack stage with an isolation problem, as evidenced by the DAS signal 240 below plug depth 210. The damage of isolation is that certain percentage of the injected fluids are filling fractures in the previous stage so the current stage fractures do not get enough fluid to meet the completion design. A better plug or diverter can be used in the next stage to improve the isolation issues. The different between dark colors at 240 and light colors at 230 is due to the surface pump rate, not due to the isolation either.

Figure 3:
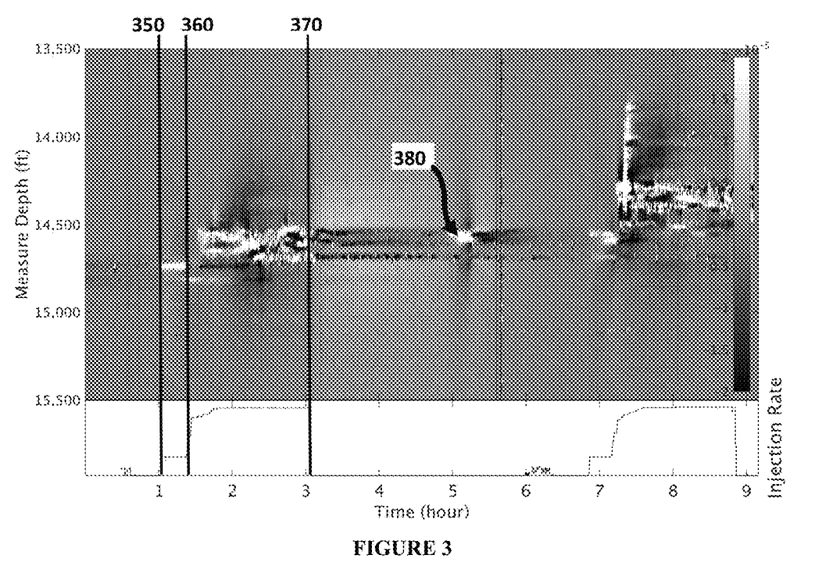
FIG. 3 depicts changes in DAS dataset 300 obtained an offset observation well as pumping activities progress. The monitor well is 700 ft away from the operation well and the cluster spacing of the monitor well is 45 ft.

FIG. 3 is an example of the low-frequency DAS signal in an observation well responding to the pumping activities. In the crosswell case, darker colors are related to compression and lighter colors are related to extension of the fiber optic cable. At the bottom, the slurry rate is shown over the course of the measurement. In FIG. 3, pumping is initiated 350 and visible extension is observed. When the plug ball seats 360 the extension stops in the observation well as pressure increases. Fracturing is observed until pumping is stopped 370. Finally, perforation gun movement 380 is observed before the process is imitated at the next location.

The various steps of the fracturing process can be detected by the DAS signal. For instance, once the fracturing fluid is no longer being pumped, the reservoir warms as the fractures slowly close.

Figure 4:
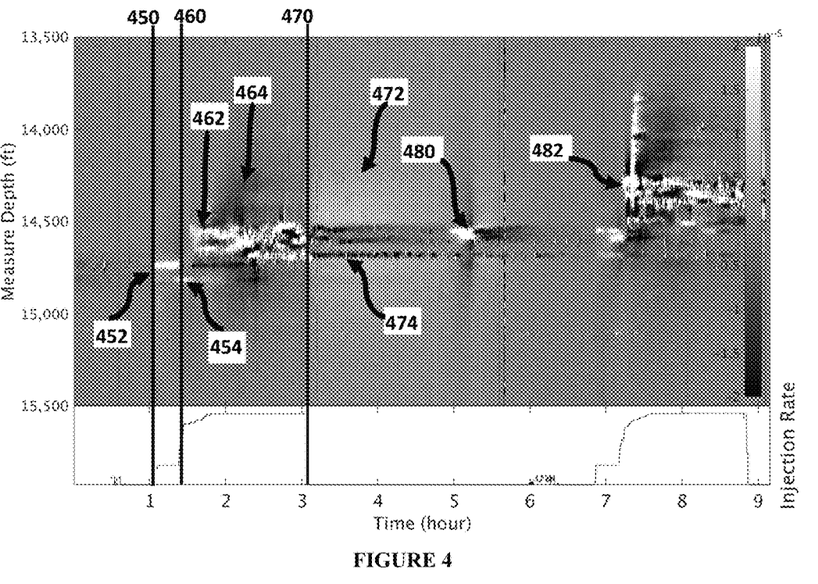
FIG. 4 depicts a manual interpretation 400 of the dataset of FIG. 3.

FIG. 4 shows an interpretation of low-frequency DAS signal in the observation well during hydraulic-fracturing operation. Horizontal linear features that are extended during pumping and contracted afterwards are individual fracture hit, which can be identified in the figure. Similar to FIG. 3, in FIG. 4 characteristic features are observed when pumping is started 450, the ball seats 460 and pumping stops 470. More detail is shown in FIG. 4 as fracture opening 452 can be observed as pumping starts 450. Once the ball seats 460, the old fractures are forced closed 454. New fractures form 462 and stress shadowing can be observed 464. When pumping stops 470, relaxation can be observed 472 and new fractures slowly close 474. Perforation gun movement 480 is observed, followed by the next series of fractures 482. They provide information about fracture geometry, spacing and density. The diffused zone surrounding those linear features with the opposite polarity are stress shadow 464 and relaxation 472 signals. They demonstrate the formation stress response to the fracture growth, which can be used to estimate fracture width at the monitor well.

The information provided by the DAS signals can be utilized in modeling stimulations for like reservoirs or for optimizing the current stimulation plan. For instance, the proppant concentration can be increased at a quicker rate to open new fractures sooner in the fracturing process or the injection of fluids can be extended to grow new fractures.

Any of the above information can be used to optimize the fracturing stimulation to improve oil recovery and/or render hydrocarbon recovery from the reservoir more economically feasible.

The following references are incorporated by reference in their entirety:

U.S. Ser. No. 62/305,758 filed Mar. 9, 2016, entitled "Low Frequency Distributed Acoustic Sensing."

U.S. Ser. No. 62/305,777 filed Mar. 9, 2016, entitled "Production Logs from Distributed Acoustic Sensors."

Co-pending application filed Mar. 8, 2017, entitled "Drilling Well Location and Ranging using DAS."

Co-pending application filed Mar. 8, 2017, entitled "The DAS Perf-PumpWork method of fluid distribution."

Co-pending application filed Mar. 8, 2017, entitled "Temperature measurement by combining DAS/DTS data."

Co-pending application filed Mar. 8, 2017, entitled "Low-Frequency DAS SNR Improvement."

US20130298665 Minchau, "System and method for monitoring strain & pressure," (2010).

US20140358444, Friehauf & Dean, "Method of Hydraulic Fracture Identification Using Temperature," (2013).

SPE 152981 (2012): Molenaar, et al., "Real-Time Downhole Monitoring of Hydraulic Fracturing Treatments Using Fibre Optic Distributed Temperature and Acoustic Sensing."

SPE 168933/URTeC 1619968 (2013): Webster, P., et al., "Developments in Diagnostic Tools for Hydraulic Fracture Geometry Analysis," Unconventional Resources Technology Conference (URTeC), Denver, Colo.

SPE 174823MS (2015): Paleja et al "Velocity Tracking for Flow Monitoring and Production Profiling Using Distributed Acoustic Sensing"

Boone, Kevin, et al. "Monitoring Hydraulic Fracturing Operations Using Fiber-Optic Distributed Acoustic Sensing." Unconventional Resources Technology Conference, San Antonio, Tex., 20-22 Jul. 2015. Society of Exploration Geophysicists, American Association of Petroleum Geologists, Society of Petroleum Engineers, 2015.

The invention claimed is:

1. A method of optimizing a hydraulic fracturing stimulation of a reservoir comprising:
   a) installing one or more fiber optic cables in at least one wellbore;
   b) attaching said one or more fiber optic cables to an interrogator having interrogation and reflection recording functions;
   c) fracturing a stage of a multistage hydraulic fracturing stimulation in a reservoir using pre-determined parameters;
   d) interrogating at least one of said fiber optic cable with an interrogation signal during said fracturing step;
   e) recording one or more reflected datasets;
   f) converting said one or more reflected datasets into a continuous record;
   g) transforming the continuous record with a low-pass filter transform with a range of greater than 0 to 50 millihertz (mHz) to provide a transformed record;
   h) down sampling the transformed record;
   i) interpreting the down-sampled transformed record to provide an interpreted record;
   j) optimizing said pre-determined parameters of said hydraulic fracturing stimulation using said interpreted record to provide optimized parameters; and,
   k) using said optimized parameters for fracturing a subsequent stage in said reservoir.

2. The method of claim 1, further comprising repeating steps d-i) a plurality of times.

3. The method of claim 1, further comprising step l) producing hydrocarbons from said reservoir.

4. The method of claim 1, wherein said at least one wellbore is a treatment wellbore, an observational wellbore, or a combination thereof.

5. The method of claim 1, wherein the continuous record is downsampled to 1, 3, 5, 10, 15, 20, 25, 50, 75, or 100 second intervals.

6. The method of claim 1, wherein said interrogating step comprises pulsing a laser light at a high frequency.

7. The method of claim 1, wherein said interpreting step comprises displaying the transformed record on a computer screen.

8. A method of optimizing a hydraulic fracturing stimulation model comprising:
   a) installing a fiber optic cable in a treatment well;
   b) installing a fiber optic cable in an observational well situated near said treatment well;
   c) attaching each fiber optic cable to an interrogator;
   d) performing at least one stage of a multistage hydraulic fracturing stimulation in said treatment well according to a hydraulic fracturing plan;
   e) interrogating each fiber optic cable with an interrogation signal during said performing step;
   f) recording a reflected dataset from each interrogator;
   g) converting each reflected dataset into a continuous record by merging the record from the same interrogator;
   h) transforming each continuous record with a low-pass filter transform with a range of greater than 0 to 50 mHz and down sampling the data to provide a transformed record;
   i) interpreting each transformed record to provide an interpreted record;
   j) optimizing said hydraulic fracturing stimulation plan using each interpreted record; and
   k) implementing an optimized hydraulic fracturing plan in subsequent fracturing stages in said reservoir.

9. The method of claim 8, further comprising repeating steps d-k) a plurality of times.

10. The method of claim 8, further comprising producing hydrocarbons from said reservoir.

11. The method of claim 8, wherein an additional fiber optic cable is deployed in a second observation well, and steps a-k are repeated in said second observation well.

12. The method of claim 8, wherein the continuous record is downsampled to 1, 3, 5, 10, 15, 20, 25, 50, 75, or 100 second intervals.

13. The method of claim 8, wherein said interrogating step comprises pulsing a laser light at a high frequency.

14. The method of claim 8, wherein said interpreting step comprises displaying the interpreted record on a computer screen.

15. The method of claim 8, wherein said reflected datasets records temperature change.

16. The method of claim 8, wherein said reflected datasets records formation stress change.

* * * * *